Aug. 22, 1944.  S. M. PARKER  2,356,468
LANDING GEAR FOR AIRCRAFT
Filed Aug. 11, 1942
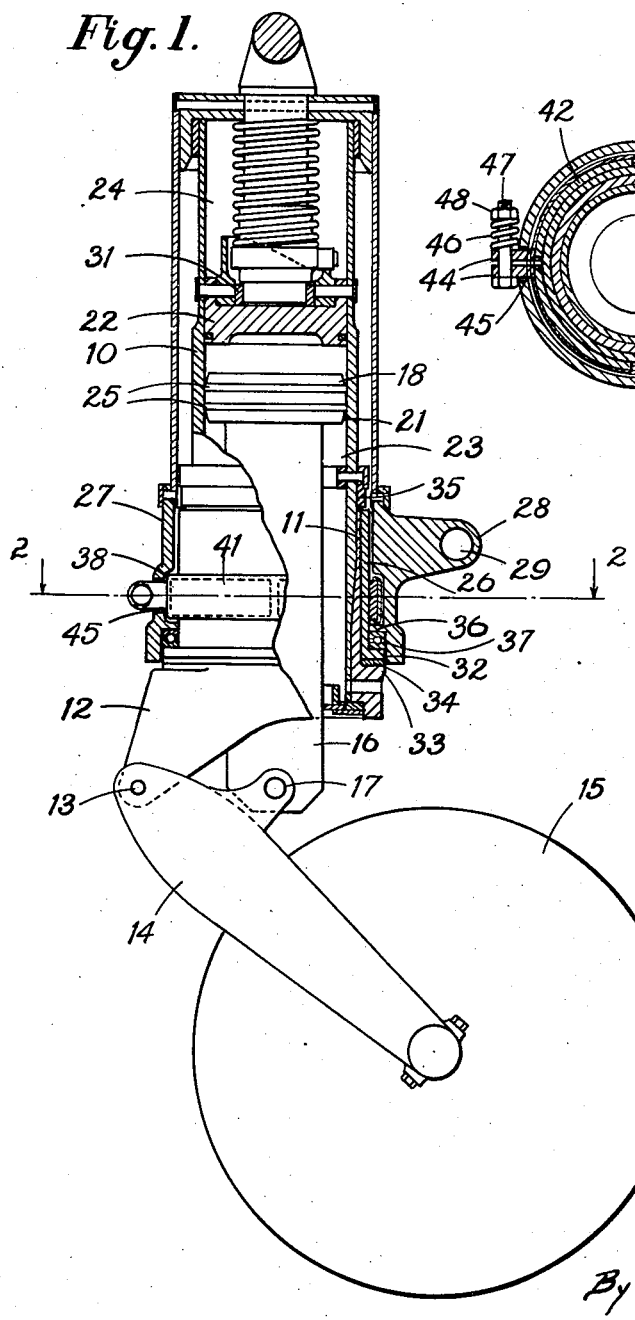
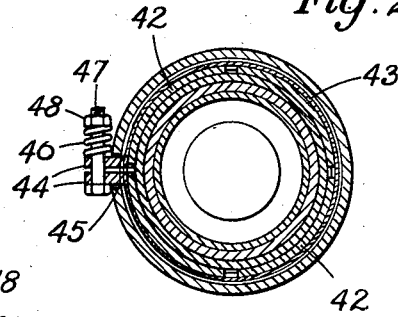
INVENTOR
S. M. PARKER
By Stevens and Davis
ATTYS.

Patented Aug. 22, 1944

2,356,468

UNITED STATES PATENT OFFICE 2,356,468

LANDING GEAR FOR AIRCRAFT

Sydney MacDonald Parker, Leamington Spa, England, assignor to Automotive Products Company Limited, Leamington Spa, England Application August 11, 1942, Serial No. 454,419, In Great Britain February 25, 1942

8 Claims. (Cl. 244—104)

This invention relates to landing gear for aircraft, and more particularly to mountings for landing wheels or equivalent landing members (such as endless tracks) which are capable of angular movement about a substantially vertical axis to permit the aircraft to travel readily in a curved path when supported by its landing gear on the ground. Such landing members are the tailwheel of an aircraft having the well-known form of landing gear comprising two or more transversely spaced main wheels forward of the centre of gravity, and a single wheel near the tail of the aircraft, and the nose wheel of the more recent form of landing gear commonly referred to as the "tricycle undercarriage."

These landing members, when deflected from their true fore-and-aft position by striking an obstruction or by any other cause, may tend to oscillate about their normal positions for a considerable period, throwing great strain on the aircraft structure and rendering control difficult, and various measures have been proposed to damp out such oscillations, such as friction bands and other friction means, and hydraulic damping.

One known kind of mounting for a landing wheel or equivalent comprises a shock absorber strut consisting of a cylinder and a plunger reciprocable therein, the cylinder of the strut being mounted in the aircraft framework and forming the sole connection between the wheel or equivalent and the aircraft, and my co-pending application Serial No. 424,974, filed December 30, 1941, describes a mounting of this kind. The primary object of the present invention is to provide improvements or modifications in the form of device described in the co-pending application above referred to.

It is an object of the present invention to provide a mounting for a landing wheel or equivalent landing member in which the frictional damping of the rotational movement of the plunger is limited to a predetermined maximum regardless of the load acting on the strut.

According to the present invention, in a mounting for a landing wheel or equivalent landing member a damping device acting on the cylinder member of the strut is arranged between the said cylinder member and an intermediate member rotatable about the axis of the cylinder with respect to both the cylinder member and the aircraft framework, the rotary movement of the intermediate member being controlled by a second frictional damping device exerting a constant resistance to rotary movement of said intermediate member.

The second frictional damping device is preferably manually adjustable to vary the resistance to rotary movement of the intermediate member.

The intermediate member may comprise a sleeve surrounding the cylinder member, and itself surrounded by an outer sleeve supported in the aircraft framework, and the intermediate sleeve may be flanged at its lower end, a ring of friction material being provided between the flange and an abutment surface on the cylinder member, the load on the strut being transmitted to the sleeve through the said abutment and flange.

The intermediate sleeve may be mounted in the outer sleeve on a thrust bearing.

The rotation of the intermediate sleeve in the outer sleeve may be restrained by a friction band engaging one of the said sleeves and held against rotation with respect to the other sleeve, the friction band being for example in frictional engagement with the intermediate sleeve and housed in an annular recess in the outer sleeve, lugs on the ends of the friction band projecting through an aperture in the outer sleeve to prevent rotation of the band. The ends of the friction band may be urged towards each other by resilient means, the loading of which may be adjustable.

The invention is hereinafter described with reference to the accompanying drawing, in which:

Figure 1 is an elevation, partly in section, of one form of mounting according to the invention; and Figure 2 is a section on the line 2—2 of Figure 1.

In the form of mounting shown in Figure 1, the cylinder 10 of a resilient telescopic strut has secured to its lower end a sleeve 11 forming an integral part of the cylinder assembly. From the sleeve 11 projects a bracket 12 to which, at a point 13 offset somewhat from the axis of the cylinder 10, is pivotally secured one end of a forked arm 14 in which the wheel 15 is mounted, the arm 14 being so arranged that the wheel axis is on the opposite side of the cylinder axis to the pivot of the arm. A tubular plunger 16 pivotally secured to the arm 14 at 17 near its pivoted end extends into the cylinder 10, and is formed at its upper end with an enlarged head 18 fitting closely within the cylinder, the head having its peripheral surface 21 which engages the wall of the cylinder of substantially part-spherical form, so that it may rock slightly during the movements of the arm 14 about its pivot.

The cylinder 10 is closed in a fluid-tight manner by a partition 22 between its ends, the part 23 below the partition forming the cylinder in which the plunger 16 operates, whilst the part 24 above the partition houses a self-centering mechanism which has been fully described in the specification of my above-mentioned co-pending application Serial No. 424,974, but is not described herein as it forms no part of the present invention. The plunger tube 16 itself is closed at its lower end and, with the lower part 23 of the cylinder 10, constitutes an oleo-pneumatic shock absorber, the air chamber of which is the plunger tube, whilst the damping is controlled by orifices (not shown) in the plunger head 18. The air is confined in the plunger tube by a floating piston (not shown) mounted therein. The plunger head 18 is provided with suitable packing means 25 to prevent the escape of the shock absorber liquid into the part of the cylinder below it.

The cylinder 10 is rotatably mounted in a bearing sleeve 26 which surrounds its lower end and is itself rotatable in an outer sleeve 27 from which projects a lug 28 in which is provided a hole 29 to receive a mounting spindle about which the mounting can swing for retraction. A second bearing for the cylinder is provided at 31 on the stem supporting the self-centering mechanism.

The sleeve 26 surrounding the lower end of the cylinder is flanged at its lower end, the flange 32 having a flat annular lower face lying opposite to the flat upper surface of an enlargement 33 at the lower end of the sleeve 11. Between the enlargement 33 and the flange 32 on the bearing sleeve, is mounted a ring 34 of friction material either loose or secured to one or other of the surfaces, the combination forming in effect a friction clutch. The cylinder has a small degree of longitudinal play in the bearing sleeve 26, being retained therein by a collar 35 secured to the cylinder above the sleeve, and the load on the strut is taken solely through the friction material 34, with the result that the pressure thereon varies with the load on the strut and becomes zero when the aircraft is airborne. The resistance to turning of the cylinder in the sleeve 26 is clearly dependent on the pressure applied to the clutch and therefore is dependent on the load on the strut.

Between the upper surface of the flange 32 and a shoulder 36 in the outer sleeve 27 is mounted a ball thrust bearing 37 through which the load is transmitted to the outer sleeve 27 and so to the aircraft framework. Above the shoulder 36 an internal annular recess 38 is formed in the outer sleeve 27 and in this recess is mounted a friction damping ban 41 located against rotational movement with respect to the sleeve 27 and engaging the outer surface of the sleeve 26. The friction band 41 comprises a plurality of segments 42 of friction material secured to a channel-shaped split carrier ring 43, the two ends of the ring being provided with lugs 44 which project through an aperture 45 in the sleeve 27, and are drawn towards each other to cause the band 41 to grip the sleeve 26 by a spring 46 mounted on a bolt 47 passing through the two lugs 44, the loading of the spring being varied by adjusting a nut 48 on the bolt 47. The band 41 is prevented from turning in the sleeve 27 by the engagement of the lugs 44 with the sides of the aperture 45 and it, therefore, serves to resist the rotational movement of the sleeve 26.

It will be readily understood that as the thrust transmitted between the strut and the aircraft is transmitted through the ring 34 of friction material the load on the latter, and therefore the friction damping between the cylinder 10 and the sleeve 26, is proportional to the load on the strut at any instant. When the aircraft is airborne the friction material is unloaded and the strut is free to turn under the influence of the self-centering mechanism.

So long as the load on the strut is small enough for the turning force exerted on the sleeve 26 by the frictional drag of the ring 34 to be less than the resistance to turning of the sleeve 26 created by the friction band 41, the degree of damping rises and falls with the load.

If, however, the load on the friction ring 34 rises sufficiently to turn the sleeve 26 against the resistance of the band 41, the sleeve 26 turns relatively to the sleeve 27, and the degree of friction damping is, therefore, limited by the setting of the band 41.

A plurality of discs of friction material alternating with metal discs may be employed between the enlargement 43 on the sleeve 11 and the bearing sleeve, the friction discs being rotationally coupled to one member and the metal discs to the other, thus increasing the frictional resistance to rotation.

What I claim is:

1. In aircraft landing gear including a landing element, a telescoping piston and cylinder shock absorber supporting said landing element from the aircraft body, and means mounting said shock absorber for rotary motion about its long axis; means rotatable about said cylinder, stationary adjustable braking means acting with uniform braking effect on the means rotatable about said cylinder and friction means interposed intermediate said cylinder and the means rotatable thereabout for retarding relative rotary motion of the two to an extent increasing as a function of the load on the shock absorber.

2. In aircraft landing gear including a landing element, a telescoping piston and cylinder shock absorber supporting said landing element from the aircraft body, and means mounting said shock absorber for rotary motion about its long axis; a flanged sleeve surrounding the cylinder of the shock absorber, said cylinder having thereon a coacting flange, an annulus of frictional material disposed intermediate said flanges whereby rotation of the cylinder relative to the sleeve will be retarded to an extent depending upon the pressure between the two flanges, and stationary braking means for frictionally retarding rotation of said sleeve.

3. In aircraft landing gear including a landing element, a telescoping piston and cylinder shock absorber supporting said landing element from the aircraft body, and means mounting said shock absorber for rotary motion about its long axis; a flanged sleeve surrounding the cylinder of the shock absorber, said cylinder having thereon a coacting flange, an annulus of frictional material disposed intermediate said flanges whereby rotation of the cylinder relative to the sleeve will be retarded to an extent depending upon the pressure between the two flanges, stationary braking means for frictionally retarding rotation of said sleeve, and means for adjusting the pressure of said braking means to adjustably predetermine the braking effect thereof.

4. An aircraft landing gear including a landing element, a telescoping piston and cylinder shock absorber supporting said landing element from the aircraft body, and means mounting said shock absorber for rotary motion about its long axis; a flanged sleeve surrounding the cylinder of the shock absorber, said cylinder having thereon a coacting flange, an annulus of frictional material disposed intermediate said flanges whereby rotation of the cylinder relative to the sleeve will be retarded to an extent depending upon the pressure between the two flanges, a second sleeve surrounding the first mentioned sleeve, means anchoring said second sleeve against rotation, and braking means mounted in said second sleeve in a position to act on the first whereby the rotative force applied to the first sleeve will vary with the shock absorber load while the resistance of the braking means thereon will remain constant.

5. An aircraft landing gear including a landing element, a telescoping piston and cylinder shock absorber supporting said landing element from the aircraft body, and means mounting said shock absorber for rotary motion about its long axis; a flanged sleeve surrounding the cylinder of the shock absorber, said cylinder having thereon a coacting flange, an annulus of frictional material disposed intermediate said flanges whereby rotation of the cylinder relative to the sleeve will be retarded to an extent depending upon the pressure between the two flanges, a second sleeve surrounding the first mentioned sleeve, means anchoring said second sleeve against rotation, and a second annulus of frictional material disposed in said second sleeve, a band surrounding said second annulus of frictional material, said band being fixed against rotation with respect to said second sleeve, and means for adjusting the circumferential dimension of said band to vary the compression exerted by the second annulus of frictional material.

6. In aircraft landing gear including a landing element, a telescoping piston and cylinder shock absorber supporting the element from the aircraft, means mounting said shock absorber for rotary motion about its long axis, and means biasing the same to one angular position in which the landing element is aligned; means rotatable about said cylinder, stationary adjustable braking means acting with uniform braking effect on the means rotatable about said cylinder and friction means interposed intermediate said cylinder and the means rotatable thereabout for retarding relative rotary motion of the two to an extent increasing as a function of the load on the shock absorber.

7. In aircraft landing gear including a landing element, a telescoping piston and cylinder shock absorber supporting the element from the aircraft, means mounting said shock absorber for rotary motion about its long axis, and means biasing the same to one angular position in which the landing element is aligned; a flanged sleeve surrounding the cylinder of the shock absorber, said cylinder having thereon a coacting flange, an annulus of frictional material disposed intermediate said flanges whereby rotation of the cylinder relative to the sleeve will be retarded to an extent depending upon the pressure between the two flanges, and braking means for frictionally retarding rotation of said sleeve.

8. In aircraft landing gear including a landing element, a telescoping piston and cylinder shock absorber supporting the element from the aircraft, means mounting said shock absorber for rotary motion about its long axis, and means biasing the same to one angular position in which the landing element is aligned; a flanged sleeve surrounding the cylinder of the shock absorber, said cylinder having thereon a coacting flange, an annulus of frictional material disposed intermediate said flanges whereby rotation of the cylinder relative to the sleeve will be retarded to an extent depending upon the pressure between the two flanges, a second sleeve surrounding the first mentioned sleeve, means anchoring said second sleeve against rotation, and a second annulus of frictional material disposed in said second sleeve, a band surrounding said second annulus of frictional material, said band being fixed against rotation with respect to said second sleeve, and means for adjusting the circumferential dimension of said band to vary the compression exerted by the second annulus of frictional material.

SYDNEY MacDONALD PARKER.